US009840043B2

United States Patent
Schulte et al.

(10) Patent No.: US 9,840,043 B2
(45) Date of Patent: Dec. 12, 2017

(54) MANUFACTURE OF THERMOPLASTIC CORE

(71) Applicant: Bell Helicopter Textron Inc., Fort Worth, TX (US)

(72) Inventors: Elliott Keller Schulte, Flower Mound, TX (US); Robert Brack, Fort Worth, TX (US); Kathleen Oldham, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 367 days.

(21) Appl. No.: 14/623,822

(22) Filed: Feb. 17, 2015

(65) Prior Publication Data

US 2016/0236406 A1    Aug. 18, 2016

(51) Int. Cl.
| | | |
|---|---|---|
| *B32B 37/00* | (2006.01) | |
| *B29C 65/00* | (2006.01) | |
| *B29D 99/00* | (2010.01) | |
| B29C 65/08 | (2006.01) | |
| B29C 65/16 | (2006.01) | |
| B29C 65/14 | (2006.01) | |

(Continued)

(52) U.S. Cl.
CPC ...... *B29C 66/5227* (2013.01); *B29D 99/0089* (2013.01); *B29C 65/02* (2013.01); *B29C 65/08* (2013.01); *B29C 65/1412* (2013.01); *B29C 65/1425* (2013.01); *B29C 65/1483* (2013.01); *B29C 65/16* (2013.01); *B29C 66/1122* (2013.01); *B29C 66/522* (2013.01); *B29C 66/54* (2013.01); *B29C 66/73921* (2013.01); *B29L 2031/082* (2013.01); *B29L 2031/3076* (2013.01); *B29L 2031/3085* (2013.01); *B29L 2031/3088* (2013.01); *B29L 2031/602* (2013.01); *B29L 2031/608* (2013.01)

(58) Field of Classification Search
CPC . B29C 65/08; B29C 65/7443; B29C 66/5227; B29D 99/0089
USPC ........................................................ 156/73.1
See application file for complete search history.

(56) References Cited

U.S. PATENT DOCUMENTS

| | | | |
|---|---|---|---|
| 6,045,890 A | 4/2000 | Green et al. | |
| 9,550,347 B2 | 1/2017 | Kendrick et al. | |
| 2015/0037533 A1* | 2/2015 | Kendrick | B32B 3/12 428/118 |

FOREIGN PATENT DOCUMENTS

| | | |
|---|---|---|
| DE | 19529227 A1 | 2/1997 |
| EP | 0459223 A2 | 12/1991 |

(Continued)

OTHER PUBLICATIONS

European Patent Office, European Search Report for Application No. 16154557.9 dated Nov. 8, 2016, 5 pp.

*Primary Examiner* — James Sells

(57) ABSTRACT

One aspect of a method of manufacturing a honeycomb core includes positioning a first thermoplastic columnar cell adjacent a second thermoplastic columnar cell, modifying a thermoplastic property of the first thermoplastic columnar cell, wherein the modified thermoplastic property permits joining a circumferential surface of the first thermoplastic columnar cell to a circumferential surface of the second thermoplastic columnar cell. The method also includes joining the circumferential surface of the first thermoplastic columnar cell having the modified thermoplastic property to the circumferential surface of the second thermoplastic columnar cell resulting in the honeycomb core.

20 Claims, 10 Drawing Sheets

(51) Int. Cl.
    *B29L 31/08*     (2006.01)
    *B29L 31/30*     (2006.01)
    *B29C 65/02*     (2006.01)
    *B29L 31/60*     (2006.01)

(56) References Cited

FOREIGN PATENT DOCUMENTS

| | | |
|---|---|---|
| EP | 2832533 A1 | 2/2015 |
| WO | 2012072149 A1 | 6/2012 |

\* cited by examiner

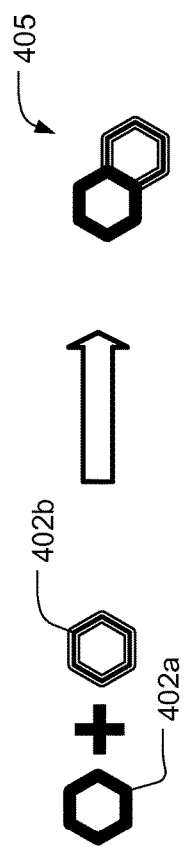
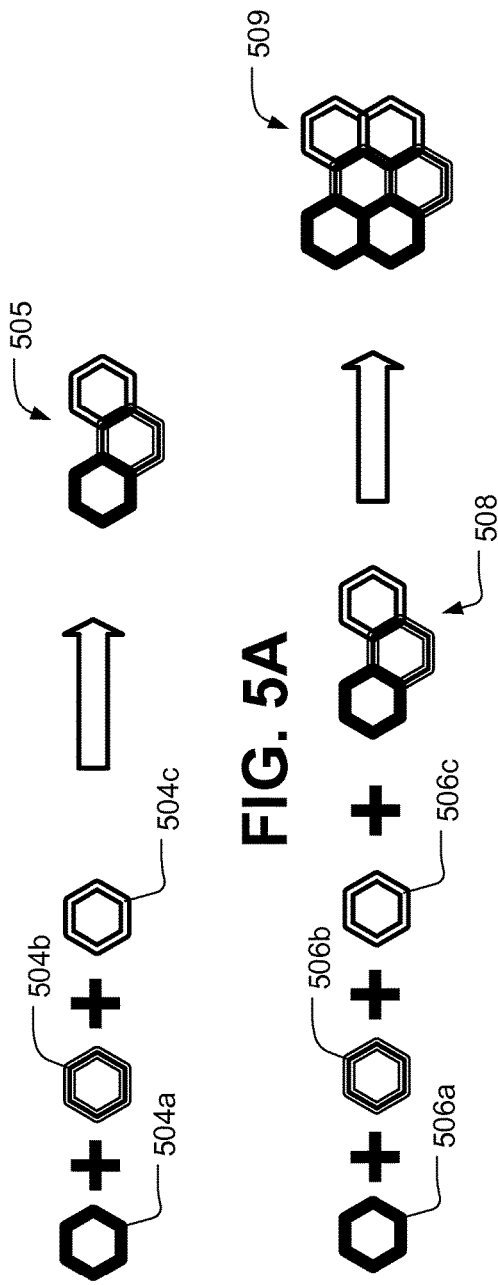

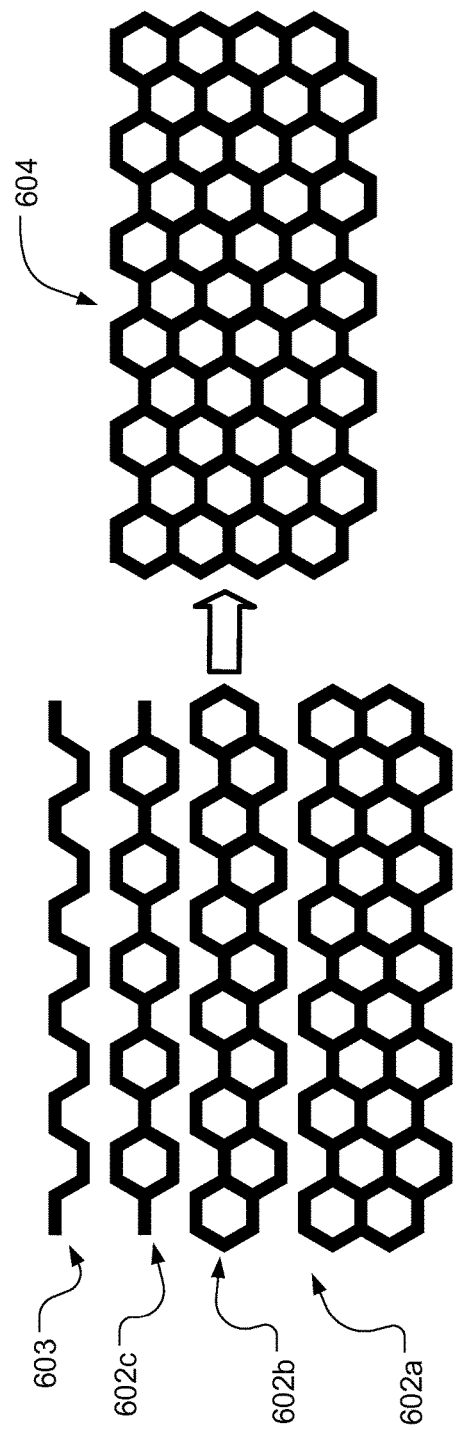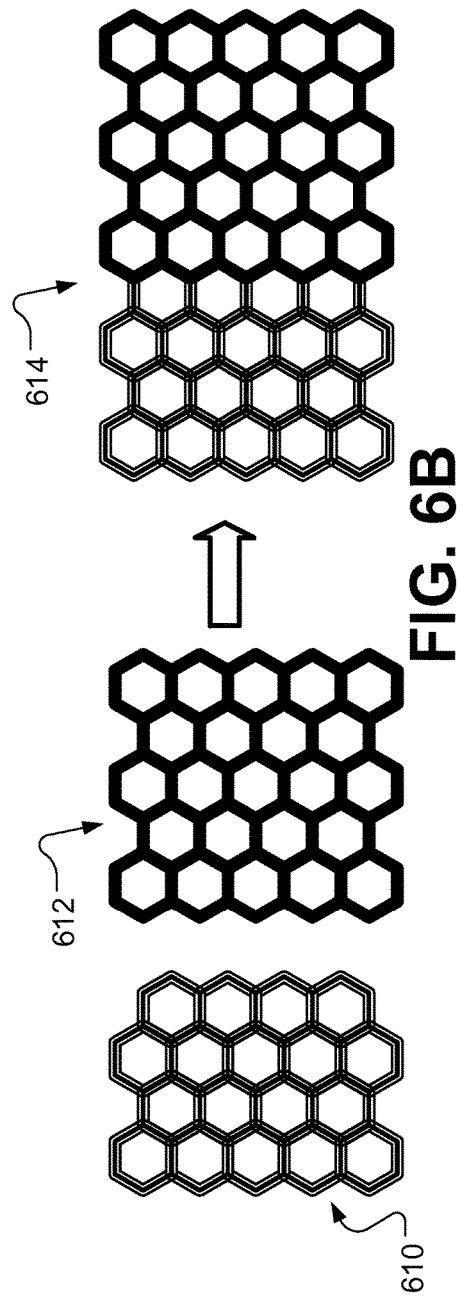

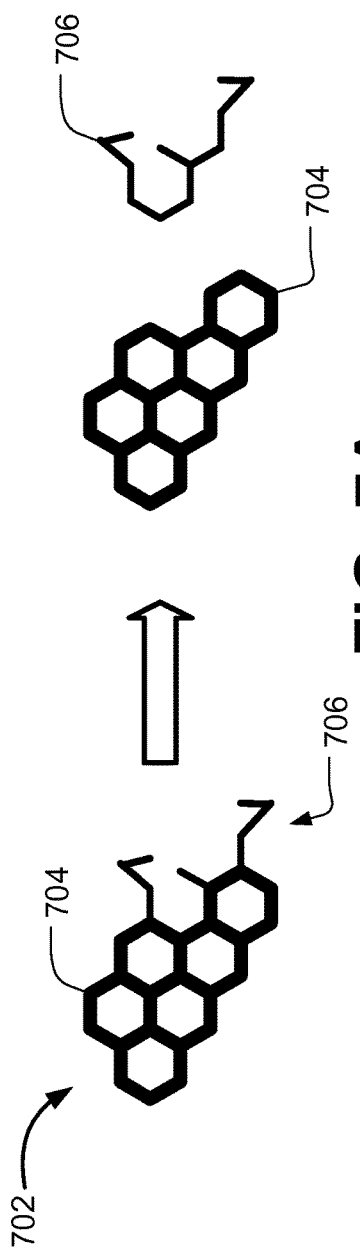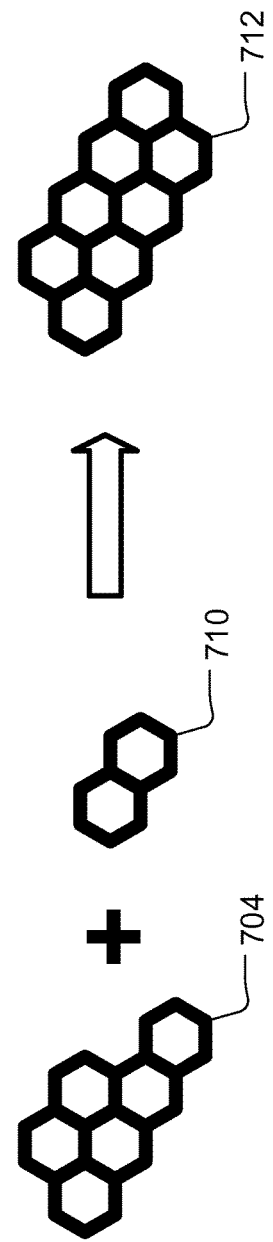
FIG. 7A
FIG. 7B

MANUFACTURE OF THERMOPLASTIC CORE

TECHNICAL FIELD

This disclosure relates to manufacturing honeycomb core using thermoplastics.

BACKGROUND

Structural components in an aircraft can be made of honeycomb core that includes multiple open adjoining cells. For example, a blade in a rotorcraft can use honeycomb core internally to provide rigidity and strength to the blade. The open structure of each cell in a honeycomb core can provide structural support while reducing weight. Honeycomb core can be made from different materials including polymers, fibers, paper, or combinations of materials. In some cases, the size of a honeycomb core is limited by the size allowed by the manufacturing process.

SUMMARY

This disclosure describes technologies relating to honeycomb core using thermoplastics.

In some aspects, a method of manufacturing a honeycomb core includes positioning a first thermoplastic columnar cell adjacent a second thermoplastic columnar cell, modifying a thermoplastic property of the first thermoplastic columnar cell, wherein the modified thermoplastic property permits joining a circumferential surface of the first thermoplastic columnar cell to a circumferential surface of the second thermoplastic columnar cell. The method also includes joining the circumferential surface of the first thermoplastic columnar cell having the modified thermoplastic property to the circumferential surface of the second thermoplastic columnar cell resulting in the honeycomb core.

This, and other aspects, can include one or more of the following features. Modifying the thermoplastic property of the first thermoplastic columnar cell can include identifying a region on the circumferential surface of the first thermoplastic columnar cell, the region encompassing less than an entirety of the circumferential surface of the first thermoplastic columnar cell. Modifying the thermoplastic property of the first thermoplastic columnar cell can also include modifying the thermoplastic property of only the identified region. Modifying the circumferential property of only the identified region can include coating the identified region with an agent having an affinity to a property modifier and passing the first thermoplastic columnar cell through the property modifier, wherein the property modifier modifies the thermoplastic property of only the identified region. The property modifier can be a microwave energy source. The method can also include positioning a third thermoplastic columnar cell adjacent the honeycomb core, modifying a thermoplastic property of either the honeycomb core or the third thermoplastic columnar cell, wherein the modified thermoplastic property of either the honeycomb core or the third thermoplastic columnar cell permits joining a circumferential surface of the third thermoplastic columnar cell and a circumferential surface of the honeycomb core to each other, and joining the circumferential surface of the third thermoplastic columnar cell to the circumferential surface of the honeycomb core. The method can include modifying a thermoplastic property of the second thermoplastic columnar cell, wherein the modified thermoplastic property of the second thermoplastic columnar cell permits removing second thermoplastic columnar cell from the honeycomb core and removing the second thermoplastic columnar cell from the honeycomb core. The method can include modifying a thermoplastic property of the second thermoplastic columnar cell prior to joining the circumferential surface of the first thermoplastic columnar cell having the modified thermoplastic property to the circumferential surface of the second thermoplastic columnar cell having the modified thermoplastic property. The thermoplastic property of the first thermoplastic columnar cell can be a surface temperature of the first thermoplastic columnar cell, and modifying the thermoplastic property of the first thermoplastic columnar cell can include heating the first thermoplastic columnar cell to increase the surface temperature of the first thermoplastic columnar cell to near a melting point of the first thermoplastic columnar cell. Heating the first thermoplastic columnar cell can include applying at least one of ultrasound, microwaves, infrared radiation or laser radiation to the first thermoplastic columnar cell. Heating the first thermoplastic columnar cell can include passing the first thermoplastic columnar cell through a heating chamber. A property of the first thermoplastic columnar cell can be different from a property of the second thermoplastic columnar cell. The property of the first thermoplastic columnar cell can include at least one of a cross-sectional shape, a cross-sectional size, a wall thickness, or thermoplastic composition of the first thermoplastic columnar cell. The property of the second thermoplastic columnar cell can include at least one of a cross-sectional shape, a cross-sectional size, a wall thickness, or thermoplastic composition of the second thermoplastic columnar cell. The method can include identifying a region in the honeycomb core including a defect and modifying a thermoplastic property of the region in the honeycomb core to rectify the defect.

In some aspects, a method of manufacturing a honeycomb core includes identifying multiple thermoplastic columnar cells, wherein a thermoplastic columnar cell in a subset of the multiple thermoplastic columnar cells including at least two thermoplastic columnar cells has a property that is different from a corresponding property of another thermoplastic columnar cell in the subset. The method also includes, for each of the multiple thermoplastic columnar cells, modifying a thermoplastic property, wherein modified thermoplastic properties of the multiple thermoplastic columnar cells enables the multiple thermoplastic columnar cells to join each other and joining the multiple thermoplastic columnar cells to form a honeycomb core.

This, and other aspects, can include one or more of the following features. A property of a thermoplastic columnar cell can include at least one of a cross-sectional shape, a cross-sectional size, a wall thickness, or thermoplastic composition of the first thermoplastic columnar cell. The subset of the multiple thermoplastic columnar cells can include a first thermoplastic columnar cell and a second thermoplastic columnar cell, and a size or a wall thickness of the first thermoplastic columnar cell can be different from a size or a wall thickness, respectively, of the second thermoplastic columnar cell. The thermoplastic property can be a surface temperature of a thermoplastic columnar cell. Modifying the thermoplastic property of the thermoplastic columnar cell can include heating the thermoplastic columnar cell to increase the surface temperature of the thermoplastic columnar cell to near a melting point of the thermoplastic columnar cell. Joining the multiple thermoplastic columnar cells can include joining the multiple thermoplastic columnar cells into a row. The method can also include forming a first corrugated row of the multiple thermoplastic columnar cells and joining the first corrugated row to a second corrugated row of multiple thermoplastic columnar cells by modifying a thermoplastic property of either the first corrugated row or the second corrugated row.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a schematic diagram of two example thermoplastic columnar cells that are joined to form an example honeycomb core.

FIGS. 5A-C is a schematic diagram of example thermoplastic columnar cells with different properties that are joined to manufacture example honeycomb cores.

FIGS. 6A-B is a schematic diagram of example thermoplastic honeycomb cores that are joined to manufacture example honeycomb cores.

FIGS. 7A-B is a schematic diagram of an example thermoplastic honeycomb core that includes a defective region.

Like reference numbers and designations in the various drawings indicate like elements.

DETAILED DESCRIPTION

Figure 1:
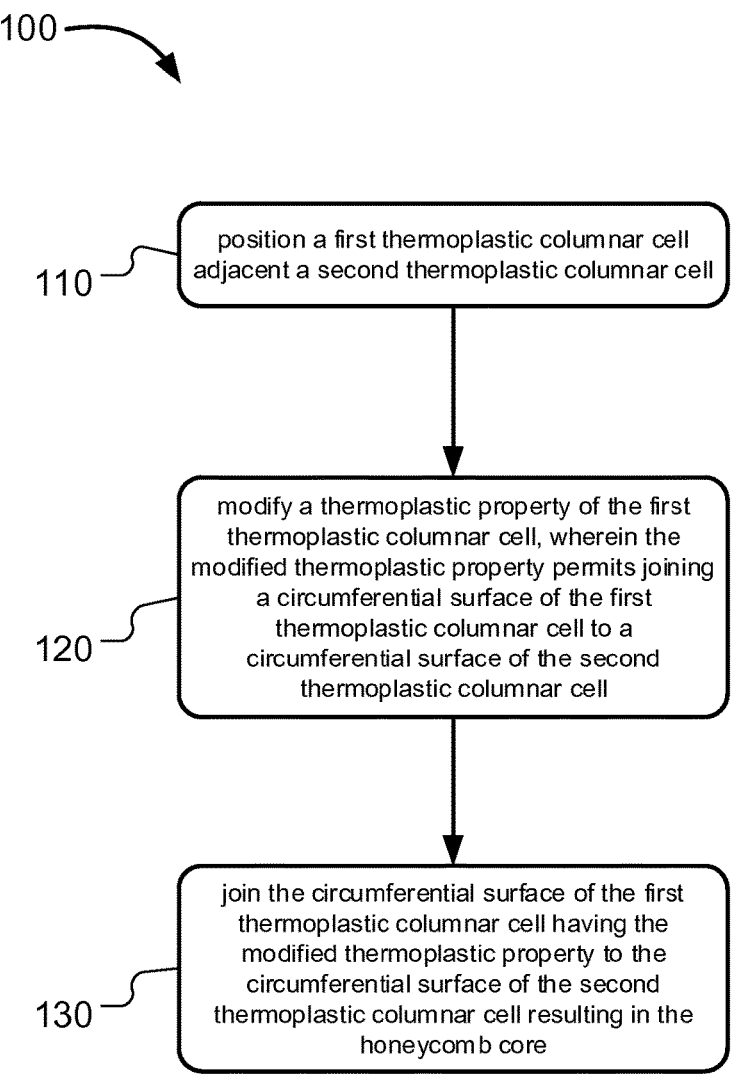
FIG. 1 is a flowchart of a first example process for manufacturing a thermoplastic honeycomb core.

This disclosure relates to manufacturing honeycomb core using thermoplastics. In some industries, components are made from honeycomb core (sometimes just called "core"), consisting of multiple joined cells that collectively provide structural support. For example, core can be made of columnar tube-like structures connected in a lattice-like arrangement. Core is often manufactured using phenolic-based materials or thermosetting materials that can be very expensive and time-consuming to process. Thermosetting materials are polymers that, once cured, retain a rigid shape. In many cases, thermosetting materials require an extensive cure time that can limit efficient manufacture. Thermosetting polymer materials can also require low temperature storage and can have a limited storage life. The propensity of thermosetting polymers to interact with the ambient environment can persist after being converted to core and incorporated into a part. The interaction with the ambient environment can degrade the mechanical performance of such a part. Core made from conventional thermosetting polymers can have storage constraints due to thermosetting polymer materials' interaction with the ambient environment, which may affect its processability. Therefore, core from thermosetting materials is typically stored in a controlled environment and may require drying operations and handling restrictions. These constraints can negatively impact the manufacturing cost and repair aspects of core from thermosetting materials. Core from thermosetting materials can sometimes be damaged during shipping, handling, or storage, and cannot be easily reconfigured or repaired without weakening the thermosetting polymer. Some types of core structures are manufactured using a batch process, and the size of these core structures is limited to the size allowed by the batch process. In some cases, large structures made of thermosetting materials must be manufactured in sections and spliced together. A component made of joined sections can be structurally weaker than a component manufactured in a single piece.

The present disclosure describes a technique for manufacturing honeycomb core using thermoplastic materials. Thermoplastic polymers are materials that maintain a relatively rigid state at lower temperatures and enter a relatively liquid state at higher temperatures (e.g., near, at, or above a melting point). Pressure may be applied to facilitate joining The amount of pressure can be determined based on the viscosity of the thermoplastic at the process temperature selected for joining. Thermoplastics can be repeatedly heated (e.g., melted) and cooled without significantly weakening or damaging the material. In some cases, two thermoplastic components can be joined by heating portions of one or both components until the thermoplastic melts, and then maintaining contact between the components as the thermoplastic cools, joining the components in what is sometimes called "melt consolidation." In this manner, a honeycomb core can be formed by joining columnar cells made of thermoplastic materials. For example, a honeycomb core can be formed cell-by-cell or row-by-row. In some cases, thermoplastic materials can be "engineered thermoplastics," such as thermoplastic materials reinforced by including fibers or particulates. For example, thermoplastic materials can be reinforced with long, continuous fibers such as biaxial fabrics, triaxial fabrics, or other types of fibers or fabrics. In some cases, the columnar cells have a transverse diameter greater than or equal to about 0.5 inches. In some cases, the columnar cells have a transverse diameter of about 1 inch.

As the columnar cells can be added individually and indefinitely, a honeycomb core of arbitrary shape and size can be manufactured. Thermoplastic multi-cell cores can be similarly joined into a single core. For example, rows made of multiple cells can be joined together. The size and shape of thermoplastic core is not limited by a batch process, and thus the size and shape of the core can be tailored to the needs of the application. Additionally, thermoplastic cells of different characteristics (e.g., a cross-sectional shape, a cross-sectional size, a wall thickness, a thermoplastic composition, length, fiber orientation, etc.) can be joined, allowing further flexibility or tailorability. Thermoplastic cells can be removed from a core and replaced without compromising the strength of the core. Thermoplastic honeycomb core can be manufactured or repaired on-site, reducing wait time and shipping costs. Additionally, thermoplastic cells can also be manufactured on site (e.g., using an extrusion process), also reducing wait time and allowing faster manufacture of core. Furthermore, thermoplastic materials can be stronger and have a longer storage life than other materials such as thermosetting materials.

FIG. 1 is a flowchart of a first example process 100 for manufacturing a thermoplastic honeycomb core. The process 100 is applicable to any industry in which honeycomb core is used. For example, the process 100 can be implemented to form honeycomb core for use in manufacturing a component of a rotorcraft or tiltrotor aircraft including as structural support for rotor blades, wings, control surfaces, or other components. The process 100 can also be implemented to form honeycomb core used for other applications, including fixed-wing aircraft, unmanned aerial vehicles, automotive applications, aerospace applications, submersible applications, infrastructure applications (e.g., bridges, trusses, or other applications), wind turbine applications, or other applications.

At 110, a first thermoplastic columnar cell is placed adjacent a second thermoplastic columnar cell. For example, a columnar cell can be a tubular shape made of a thermoplastic material. The columnar cell can have a cross-sectional shape such as a circle, hexagon, square, triangle, an irregular shape, or another shape. In some cases, the first columnar cell and/or the second columnar cell is part of a multi-cell structure, for example, a row of columnar cells or a bulk honeycomb core. In some implementations, the first columnar cell has different characteristics than the second columnar cell, as described below.

At 120, a thermoplastic property of the first thermoplastic columnar cell is modified. The modified thermoplastic property permits joining a circumferential surface of the first thermoplastic columnar cell to a circumferential surface of the second thermoplastic columnar cell. The thermoplastic property of the cell surface can be temperature, viscosity, elastic modulus, adhesiveness, and/or another property that permits joining For example, the surface temperature of the first thermoplastic columnar cell and/or the second thermoplastic columnar cell can be increased to near a melting point of the thermoplastic surface by heating. In some implementations, a region can be identified on the circumferential surface of the first cell that is less than the entirety of the circumferential surface. The thermoplastic property of only the identified region can then be modified. For example, one or more separate regions on the outer surface of a thermoplastic cell can be heated without substantially heating the remaining portion of the surface. These regions can be located, for example, on the outer surface of the columnar cell and/or on an inner surface of the columnar cell. In some implementations, a thermoplastic property of the entire surface of the first cell and/or second cell can be modified.

A surface of the first thermoplastic columnar cell can be heated using one or more techniques. In some implementations, the surface can be heated using ultrasonic vibrations, friction, or mechanical pressure. In some implementations, the surface can be heated using microwave radiation, infrared radiation, laser radiation, or other types of radiation. For example, laser radiation can be directed at one or more identified regions on the surface to selectively heat those regions. In some implementations, the surface is heated by proximity to or contact with a heat source such as a soldering iron, heating element, heated object, or other heat source. In some implementations, the surface is heated by exposure to a heated gas (e.g., hot air or other heated gas) or a heated liquid. In some implementations, the cell is passed through a heating chamber to heat a surface of the cell. In other implementations, the surface is heated using a different technique than those described here.

In some implementations, the surface of the first cell is modified by exposing the surface of the cell to a modifying substance. For example, exposing the thermoplastic surface of the cell to a solvent can modify the thermoplastic surface to allow it to join to another thermoplastic surface. As another example, a coating can change the temperature of the melting point of the surface of the thermoplastic cell. In some implementations, the identified region on the surface is coated with an agent having an affinity to a property modifier. Passing the first thermoplastic columnar cell through the property modifier modifies the thermoplastic property of only the identified region to permit joining For example, a coating that is sensitive to microwave radiation can be applied to certain regions of the cell. Upon exposing the cell to microwave radiation from a microwave energy source, the coating can modify a property of the cell in the regions contacting the coating. A coating could also be a low molecular weight polymer or monomer that is the same or different from the base honeycomb core material. The polymer or monomer coating can be functionalized or modified to become sensitive to excitation from radiation. Other modifying substances, chemicals, coatings, or agents can be used in other implementations.

At 130, a portion of the circumferential surface of the first thermoplastic columnar cell having the modified thermoplastic property is joined to the circumferential surface of the second thermoplastic columnar cell, resulting in the honeycomb core. For example, in some implementations, a heated thermoplastic surface on the first cell contacts a thermoplastic surface on the second cell, causing the two cells to consolidate into a single component as the heated thermoplastic material cools. In some implementations, a thermoplastic property on a surface of the second cell can be modified prior to joining the two cells. For example, in some implementations, a respective surface on each cell can be heated prior to joining the cells. In some implementations, the thermoplastic property of the first cell that is modified is different from the thermoplastic property of the second cell that is modified. In some implementations, more than two thermoplastic columnar cells can be joined simultaneously, resulting in a honeycomb core. For example, a thermoplastic property on some or all of the respective surfaces on more than two thermoplastic columnar cells can modified simultaneously or sequentially, and the multiple thermoplastic columnar cells can be joined simultaneously.

Figure 2A:
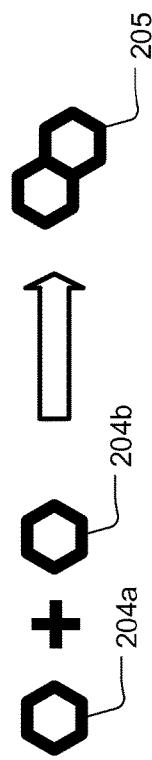
FIGS. 2A-D is a schematic diagram of example thermoplastic columnar cells joined to manufacture honeycomb cores.
Figure 2B:
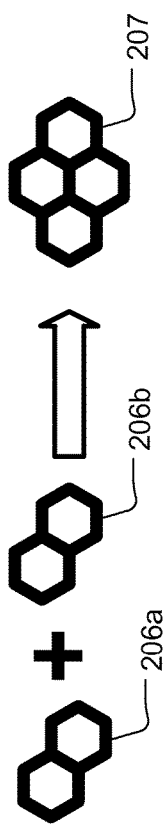
Figure 2C:
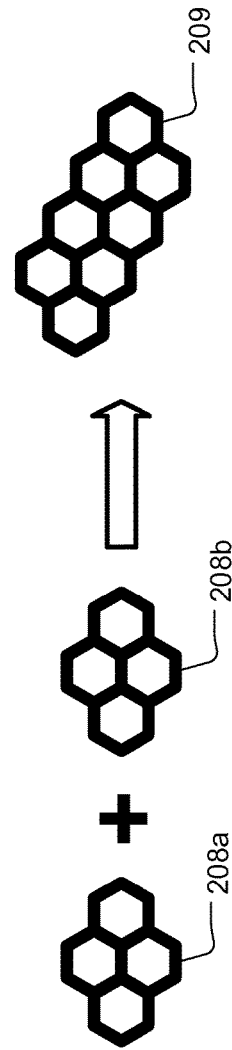

FIGS. 2A-D illustrate example thermoplastic columnar cells joined to manufacture honeycomb cores. The honeycomb cores can, for example, be manufactured using process 100, process 300 (described below), or another process. Each example shows cross-sections of the columnar cells and the honeycomb cores. FIGS. 2A-D show hexagonal cells, and other implementations can use cells of other shapes as described previously. In FIG. 2A, one or more surfaces of first single columnar cell 204a is joined to a surface of a second single columnar cell 204b, resulting in a 2-cell honeycomb core 205. In FIG. 2B, two 2-cell cores 206a-b are joined at one or more surfaces resulting in 4-cell core 207. Each 2-cell core 206a-b can be manufactured, for example, by joining two single columnar cells such as cells 204a-b in FIG. 2A. In FIG. 2C, two 4-cell cores 208a-b are joined at one or more surfaces resulting in 8-cell core 209. In similar manner, a number of thermoplastic columnar cells can be joined to a number of thermoplastic columnar cells to form a honeycomb core of arbitrary size and shape. In some implementations, more than two multi-cell cores can be joined simultaneously. In some implementations, thermoplastic columnar cells or multi-cell honeycomb cores can be joined in the columnar orientation. For example, two or more single thermoplastic columnar cells can be joined at their columnar ends, resulting in a longer single thermoplastic columnar cell. In a similar manner, multi-cell honeycomb cores of similar or different sizes and shapes can be joined in the columnar direction.

Figure 2D:
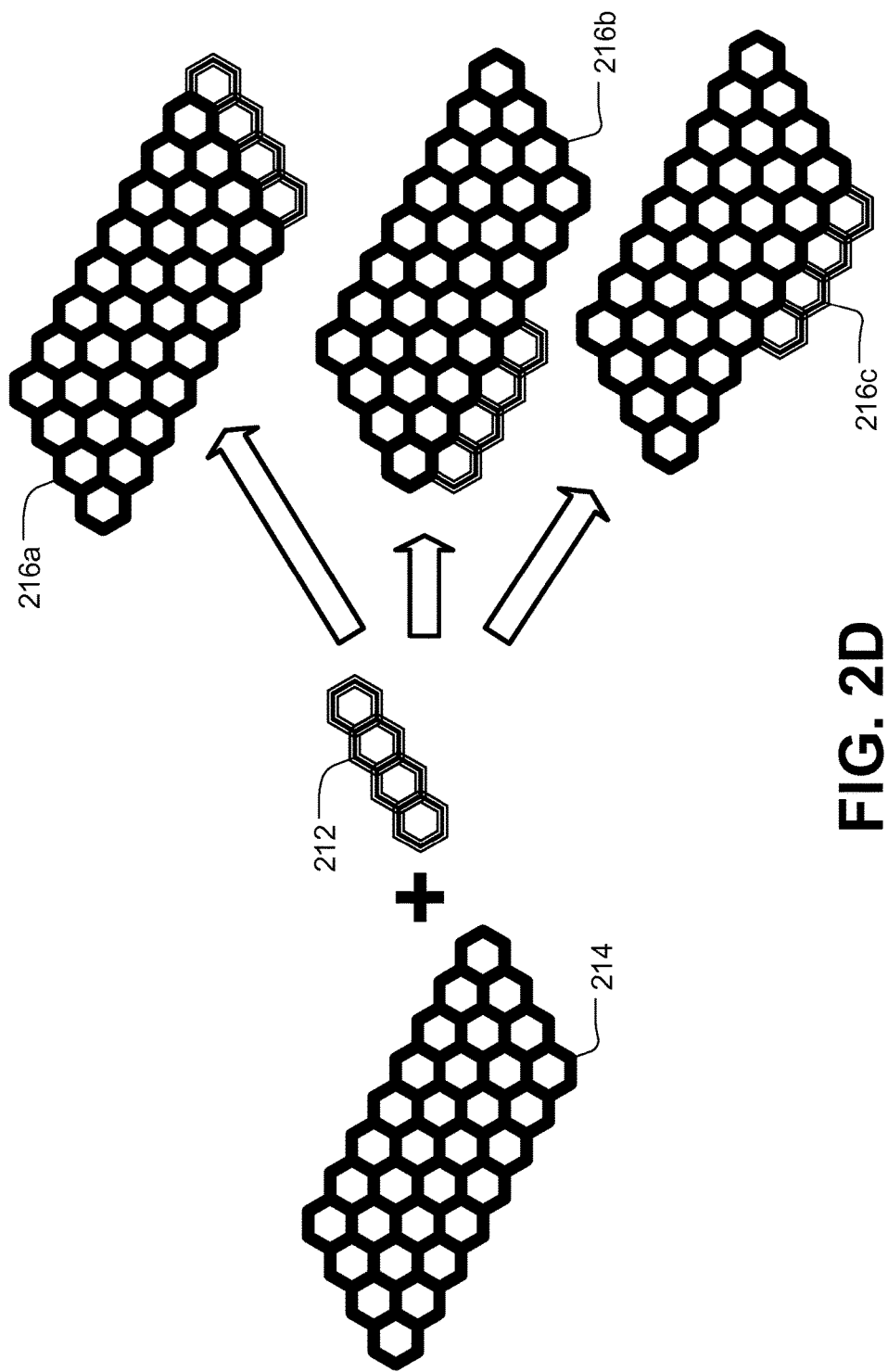

FIG. 2D illustrates another configuration of thermoplastic columnar cells that can make honeycomb core. In example 210, a first multi-cell honeycomb core 212 is to be joined to a second multi-cell honeycomb core 214. The first core 212 can be joined to the second core 214 at many possible locations. Honeycomb cores 216a-c show three example cores that can result from different locations the first core 212 can be joined to second core 214. In this manner, FIG. 2D shows how existing thermoplastic honeycomb core can be modularly augmented to form a desired configuration. FIG. 2D illustrates an example implementation; in other implementations, other cells and other multi-cell cores can be joined in other configurations.

Figure 3:
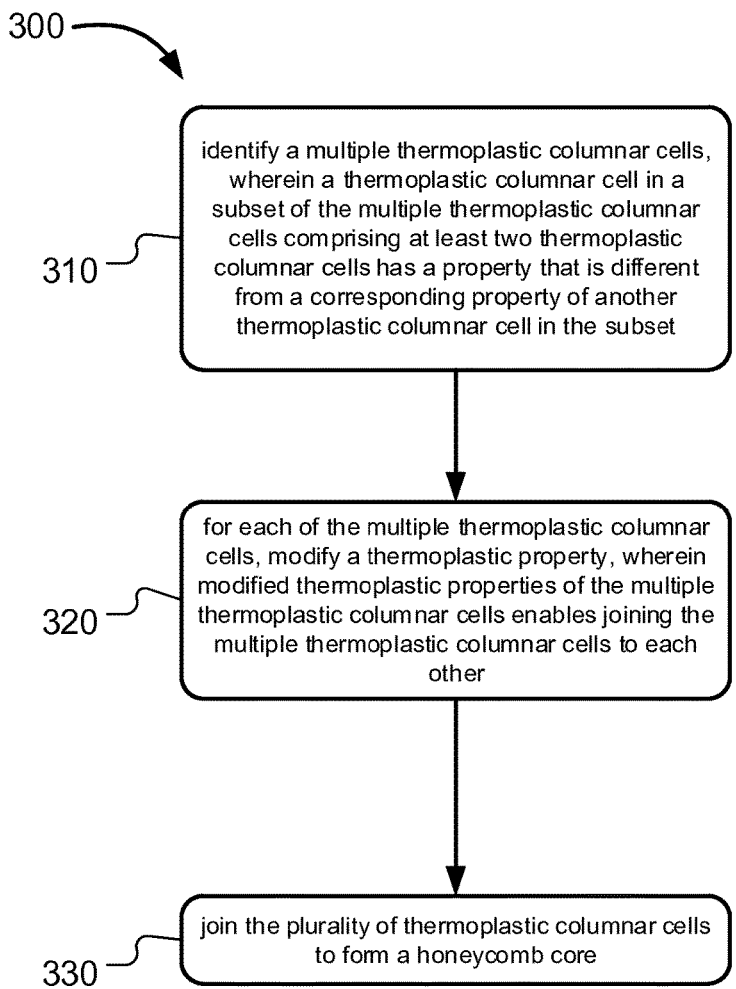
FIG. 3 is a flowchart of a second example process for manufacturing a thermoplastic honeycomb core.

FIG. 3 is a flowchart of a second example process 300 for manufacturing a thermoplastic honeycomb core. At 310, multiple thermoplastic columnar cells are identified. One thermoplastic columnar cell in a subset of the multiple thermoplastic columnar cells has one or more properties that are different from a corresponding property of another thermoplastic columnar cell in the subset. For example, one or more first cells within a collection of cells can have different properties than one or more second cells in the collection. A property of the cells can be, for example, a cross-sectional shape, a cross-sectional size, a wall thickness, a thermoplastic composition, a length, a fiber orientation, or another property.

At 320, for each of the multiple thermoplastic columnar cells, a thermoplastic property is modified. The modified thermoplastic properties of the multiple thermoplastic columnar cells enables joining the multiple thermoplastic columnar cells to each other. For example, portions of the cells can be heated, treated with a modifying substance, or modified using other techniques, including those described previously.

At 330, the multiple thermoplastic columnar cells are joined to form a honeycomb core. For example, FIG. 4 illustrates two example thermoplastic columnar cells 402a-b that are joined to form an example honeycomb core 403. The honeycomb cores can, for example, be manufactured using process 100, process 300, or another process. In this implementation, the first cell 402a has at least one different property than the second cell 402. For example, the first cell 402a can have a different sidewall thickness or size than the second cell 402b. The cells 402a-b can have these or other different properties, including multiple different properties.

Figure 5C:
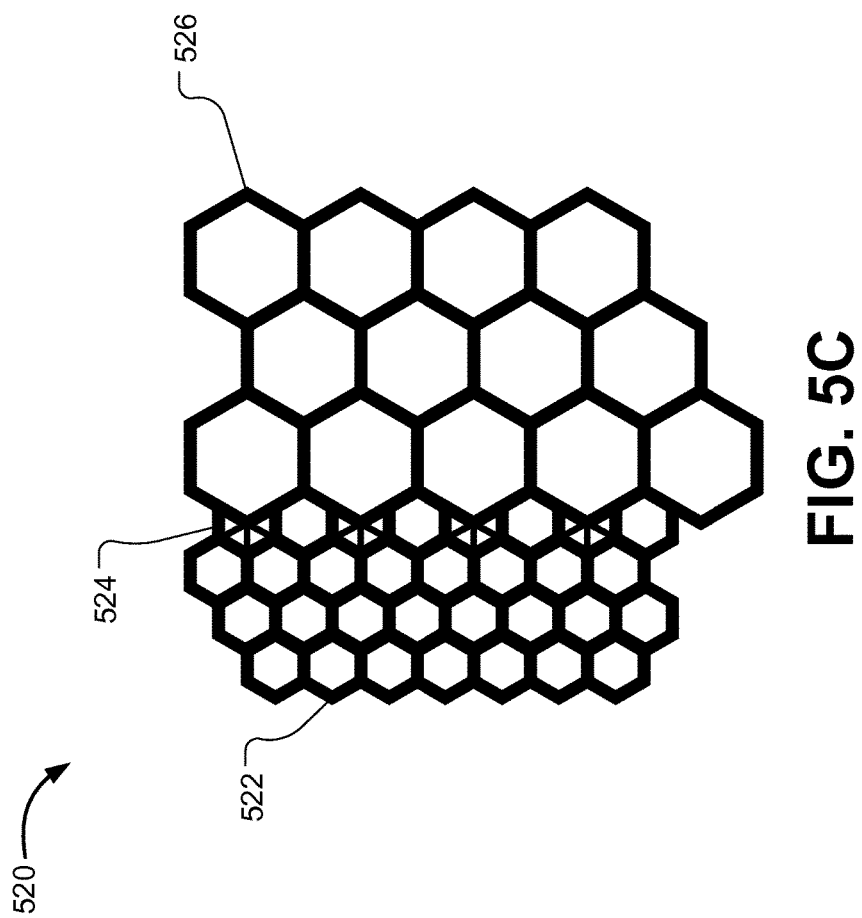

FIGS. 5A-C illustrate example thermoplastic columnar cells with different properties that are joined to manufacture example honeycomb cores 505, 509, 520. The honeycomb cores can, for example, be manufactured using process 100, process 300, or another process. FIG. 5A includes a set of three example thermoplastic columnar cells, including a first thermoplastic columnar cell 504a, a second thermoplastic columnar cell 504b, and a third thermoplastic columnar cell 504c. Each of the three individual cells 504a-c have one or more different properties than the other cells. In some implementations, more than one cell have the same properties. The three cells 504a-c are joined to form a 3-cell honeycomb core 505. In this example, three cells with different properties are joined; in other implementations, more or fewer cells with similar or different properties can be joined.

FIG. 5B includes a set of three example thermoplastic columnar cells 506a-c, each cell having different properties than the other cells. The three cells 506a-c are joined to a 3-cell honeycomb core 508, resulting in a 6-cell honeycomb core 509. In some implementations, the 3-cell core 508 is the same as the 3-cell core 505 shown in schematic 401. In some implementations, the three cells 506a-c have the same properties or different properties than the properties of the cells in 3-cell core 508. The 3-cell core 508 and 6-cell core 509 are examples, other implementations can have cores containing more or fewer cells. In this manner, honeycomb cores containing cells with different properties can be formed. As the core is formed, each type of cell can be joined at a desired location.

FIG. 5C shows an example honeycomb core 520 formed from thermoplastic columnar cells of different sizes and shapes. The example honeycomb core 520 includes large hexagonal cells 526, small hexagonal cells 522, and triangular cells 524. Other implementations can use cells of other sizes and shapes to form a honeycomb core. The cells can be sized and arranged such that the honeycomb core can have desired characteristics, such as shape, size, weight, strength, or other characteristics. For example, smaller cells (e.g., cells 522) can be used in a portion of a core to enhance the structural properties of that portion. As another example, larger cells (e.g., cells 526) can be used in a portion of a core to reduce average weight in that portion. Different sizes of cells can also be used, for example, so that a core can fill a certain shape more efficiently or more completely.

FIGS. 6A-6B illustrate example thermoplastic honeycomb cores that are joined to respectively manufacture example honeycomb cores 604, 614. FIG. 6A includes a set of thermoplastic honeycomb cores 602a-c and a corrugated thermoplastic ribbon 603 that are joined to form honeycomb core 604. In FIG. 6A, the first example core 602a is a bulk honeycomb core of arbitrary size that includes a large number of cells. The second example core 602b is made of cells in an alternating arrangement to form a row. The third example core 602c is a corrugated row of cells. An example corrugated thermoplastic ribbon 603 is also used to form honeycomb core 604. Due to the adaptable nature of the process described in this disclosure, thermoplastic components other than cells or cores can be joined to thermoplastic cells or cores. Thermoplastic ribbon 603 is an example thermoplastic component; other examples include thermoplastic sheets, ribbons, tubes, blocks, or other thermoplastic components. Each of the thermoplastic cores 602a-c can include cells that have different properties. The thermoplastic ribbon 603 can also have different properties than the cores 602a-b, such as composition, wall thickness, etc. Multiple thermoplastic cores, rows, ribbons, etc. can be joined in this manner to form a core. For example, a first corrugated row can be joined to a second corrugated row. As another example, FIG. 6B shows a first honeycomb core 610 with a first set of properties that is joined to a second honeycomb core 612 with a second set of properties to form a honeycomb core 614.

In some implementations, a region on a honeycomb core that includes a defect can be identified. Using techniques described in this disclosure, the region can be modified to rectify the defect. For example, FIGS. 7A-B illustrate an example thermoplastic honeycomb core 702 that includes a defective region 706. FIG. 7A shows that the defective region 706 of core can be removed from the remaining portion 704 of core. The defective region 706 can be removed by modifying a thermoplastic property of the defective region 706 and/or the remaining portion 704. For example, the defective region 706 can be removed from the remaining portion 704 by heating and melting a part of the thermoplastic joint between the defective region 706 and the remaining portion 704 and separating the defective region 706 from the remaining portion 704. In this manner, individual cells or groups of cells can be removed from a thermoplastic honeycomb core.

After removal, the damaged cells can be replaced with other cells. For example, FIG. 7B shows that replacement cells 710 can be joined to the portion 704 to form a repaired honeycomb core 712. In this manner, cells or groups of cells in a honeycomb core can be replaced. In some implementations, the cells or groups of cells are replaced by cells or groups of cells having different properties. The ability to repair a portion of a thermoplastic honeycomb core instead of replacing the entire core can save costs and time.

Figure 8:
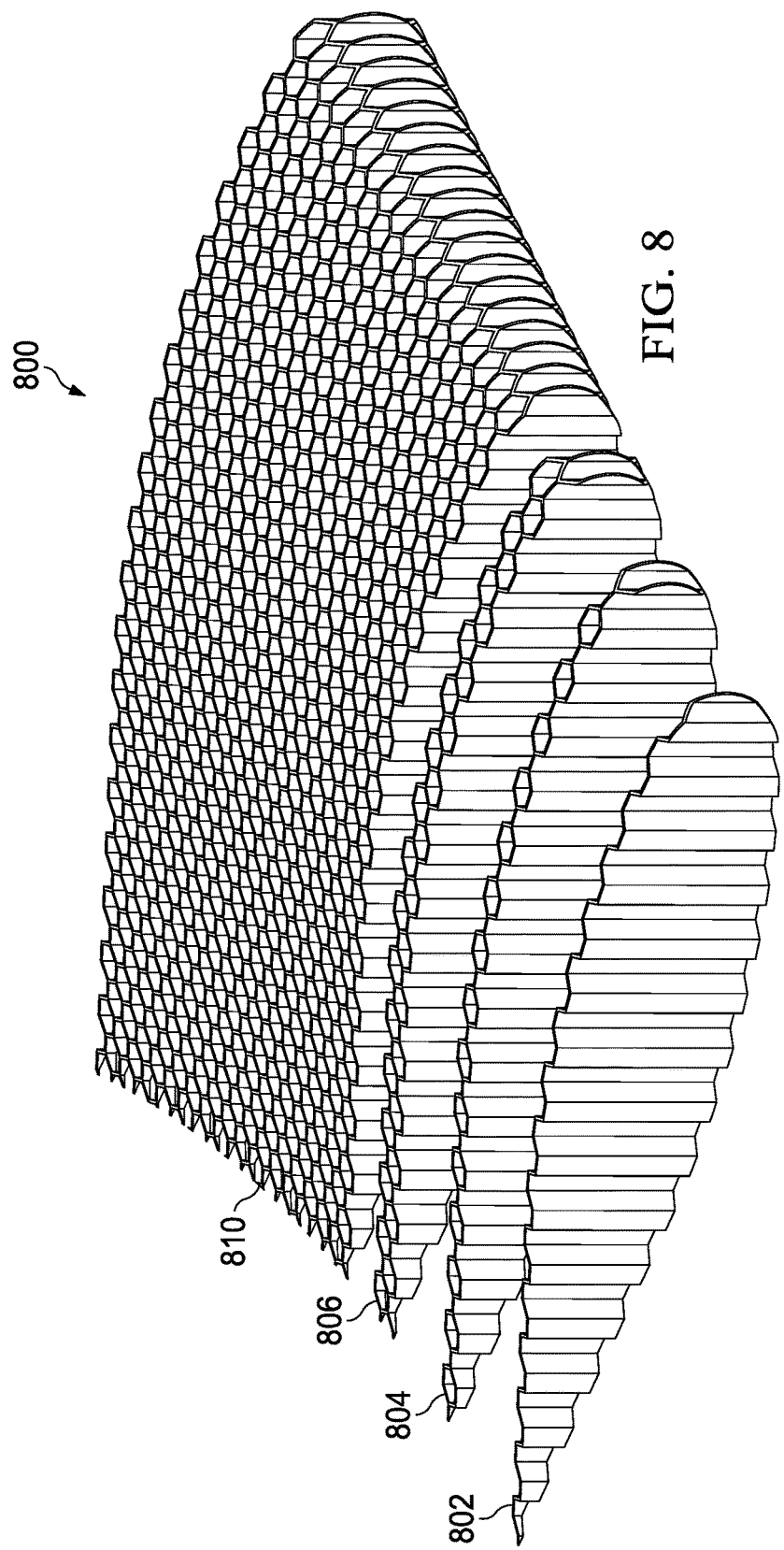
FIG. 8 is a schematic diagram of an example honeycomb core that can be used in an aircraft.
Figure 9:
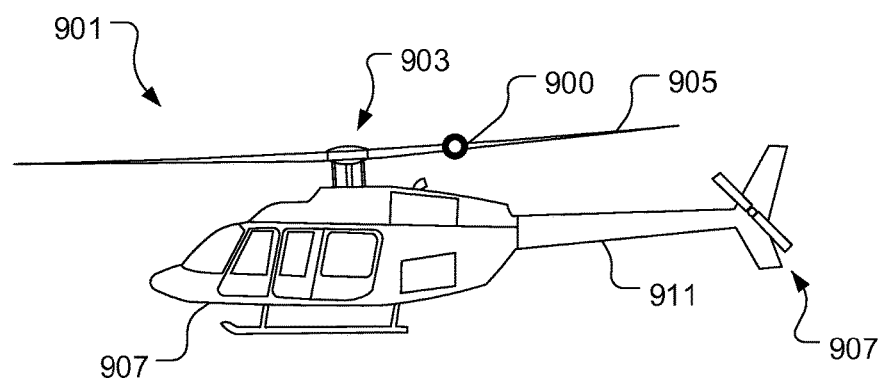
FIG. 9 is a schematic diagram showing an example of a rotorcraft.

The techniques described in this disclosure can be used to manufacture honeycomb core used in aircraft. For example, FIG. 8 shows an example honeycomb core 800 that can be used in an aircraft in a wing, rotor blade, or other component. The honeycomb core 800 can be formed by joining thermoplastic components 802, 804, 806, 810 using techniques described in this disclosure. By selecting specific sizes and shapes of thermoplastic cells and thermoplastic components, the shape and size of honeycomb core 800 can be defined for a specific application. FIG. 9 shows an example rotorcraft 901 that can include a honeycomb core like honeycomb core 800 or other honeycomb cores described in this disclosure. Rotorcraft 901 has a rotor system 903 with multiple rotor blades 905. Rotorcraft 901 can further include a fuselage 907, anti-torque system 909, and an empennage 911. An example honeycomb core 900 is shown in an example location on the rotor blade 905 of the rotorcraft 901, though honeycomb cores can be at other locations in the rotorcraft 901.

Figure 10:
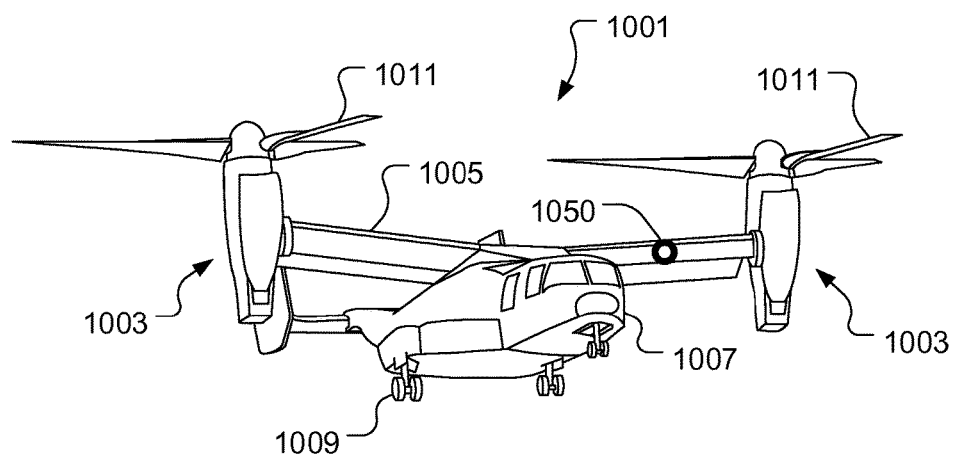
FIG. 10 is a schematic diagram showing an example of a tiltrotor aircraft.

As another example aircraft, FIG. 10 shows a schematic diagram of an example tiltrotor aircraft 1001. Aircraft 1001 includes a fuselage 1007 with attached wings 1005. Nacelles 1003 are carried at the outboard ends of wings 1005 and are rotatable between the helicopter-mode position shown and a forward-facing airplane-mode position (not shown). Nacelles 1003 carry engines and transmissions for powering rotor systems 1011 in rotation. An engine may be an internal combustion engine, an electrical power source and associated motor, or any other suitable technique for powering rotor system 1011. The tiltrotor aircraft 1001 can also include honeycomb cores that can be formed by techniques described in this disclosure. Honeycomb core 1050 is shown in an example location on the wing 1005 of the tiltrotor aircraft 1001, though honeycomb cores can be at other locations in the tiltrotor aircraft 1001.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of manufacturing a honeycomb core for a structural aircraft component, the method comprising:
   positioning a first thermoplastic columnar cell adjacent a second thermoplastic columnar cell;
   modifying a thermoplastic property of the first thermoplastic columnar cell, wherein the modified thermoplastic property permits joining a circumferential surface of the first thermoplastic columnar cell to a circumferential surface of the second thermoplastic columnar cell; and
   joining the circumferential surface of the first thermoplastic columnar cell having the modified thermoplastic property to the circumferential surface of the second thermoplastic columnar cell resulting in the honeycomb core for the structural aircraft component.

2. The method of claim 1, wherein modifying the thermoplastic property of the first thermoplastic columnar cell comprises:
   identifying a region on the circumferential surface of the first thermoplastic columnar cell, the region encompassing less than an entirety of the circumferential surface of the first thermoplastic columnar cell; and
   modifying the thermoplastic property of only the identified region.

3. The method of claim 2, wherein modifying the circumferential property of only the identified region comprises:
   coating the identified region with an agent having an affinity to a property modifier; and
   passing the first thermoplastic columnar cell through the property modifier, wherein the property modifier modifies the thermoplastic property of only the identified region.

4. The method of claim 3, wherein the property modifier is a microwave energy source.

5. The method of claim 1, further comprising:
   positioning a third thermoplastic columnar cell adjacent the honeycomb core;
   modifying a thermoplastic property of either the honeycomb core or the third thermoplastic columnar cell, wherein the modified thermoplastic property of either the honeycomb core or the third thermoplastic columnar cell permits joining a circumferential surface of the third thermoplastic columnar cell and a circumferential surface of the honeycomb core to each other; and
   joining the circumferential surface of the third thermoplastic columnar cell to the circumferential surface of the honeycomb core.

6. The method of claim 5, further comprising:
   modifying a thermoplastic property of the second thermoplastic columnar cell, wherein the modified thermoplastic property of the second thermoplastic columnar cell permits removing second thermoplastic columnar cell from the honeycomb core; and
   removing the second thermoplastic columnar cell from the honeycomb core.

7. The method of claim 1, further comprising modifying a thermoplastic property of the second thermoplastic columnar cell prior to joining the circumferential surface of the first thermoplastic columnar cell having the modified thermoplastic property to the circumferential surface of the second thermoplastic columnar cell having the modified thermoplastic property.

8. The method of claim 1, wherein the thermoplastic property of the first thermoplastic columnar cell is a surface temperature of the first thermoplastic columnar cell, and wherein modifying the thermoplastic property of the first thermoplastic columnar cell comprises heating the first thermoplastic columnar cell to increase the surface temperature of the first thermoplastic columnar cell to near a melting point of the first thermoplastic columnar cell.

9. The method of claim 8, wherein heating the first thermoplastic columnar cell comprises applying at least one of ultrasound, microwaves, infrared radiation or laser radiation to the first thermoplastic columnar cell.

10. The method of claim 8, wherein heating the first thermoplastic columnar cell comprises passing the first thermoplastic columnar cell through a heating chamber.

11. The method of claim 1, wherein a property of the first thermoplastic columnar cell is different from a property of the second thermoplastic columnar cell.

12. The method of claim 11, wherein the property of the first thermoplastic columnar cell comprises at least one of a cross-sectional shape, a cross-sectional size, a wall thickness, or thermoplastic composition of the first thermoplastic columnar cell.

13. The method of claim 11, wherein the property of the second thermoplastic columnar cell comprises at least one of a cross-sectional shape, a cross-sectional size, a wall thickness, or thermoplastic composition of the second thermoplastic columnar cell.

14. The method of claim 1, further comprising:
identifying a region in the honeycomb core comprising a defect; and
modifying a thermoplastic property of the region in the honeycomb core to rectify the defect.

15. A method of manufacturing a honeycomb core for a structural aircraft component, the method comprising:
identifying a plurality of thermoplastic columnar cells, wherein a thermoplastic columnar cell in a subset of the plurality of thermoplastic columnar cells comprising at least two thermoplastic columnar cells has a property that is different from a corresponding property of another thermoplastic columnar cell in the subset;
for each of the plurality of thermoplastic columnar cells, modifying a thermoplastic property, wherein modified thermoplastic properties of the plurality of thermoplastic columnar cells enables the plurality of thermoplastic columnar cells to join each other; and
joining the plurality of thermoplastic columnar cells to form the honeycomb core for the structural aircraft component.

16. The method of claim 15, wherein a property of a thermoplastic columnar cell comprises at least one of a cross-sectional shape, a cross-sectional size, a wall thickness, or thermoplastic composition of the first thermoplastic columnar cell.

17. The method of claim 15, wherein the subset of the plurality of thermoplastic columnar cells comprises a first thermoplastic columnar cell and a second thermoplastic columnar cell, and wherein a size or a wall thickness of the first thermoplastic columnar cell is different from a size or a wall thickness, respectively, of the second thermoplastic columnar cell.

18. The method of claim 15, wherein the thermoplastic property is a surface temperature of a thermoplastic columnar cell.

19. The method of claim 18, wherein modifying the thermoplastic property of the thermoplastic columnar cell comprises heating the thermoplastic columnar cell to increase the surface temperature of the thermoplastic columnar cell to near a melting point of the thermoplastic columnar cell.

20. The method of claim 15, wherein joining the plurality of thermoplastic columnar cells comprises joining the plurality of thermoplastic columnar cells into a row, and wherein the method further comprises:
forming a first corrugated row of the plurality of thermoplastic columnar cells; and
joining the first corrugated row to a second corrugated row of a plurality of thermoplastic columnar cells by modifying a thermoplastic property of either the first corrugated row or the second corrugated row.

* * * * *